J. G. POE.
EMERGENCY TIRE.
APPLICATION FILED AUG. 30, 1917.
1,251,277.
Patented Dec. 25, 1917.
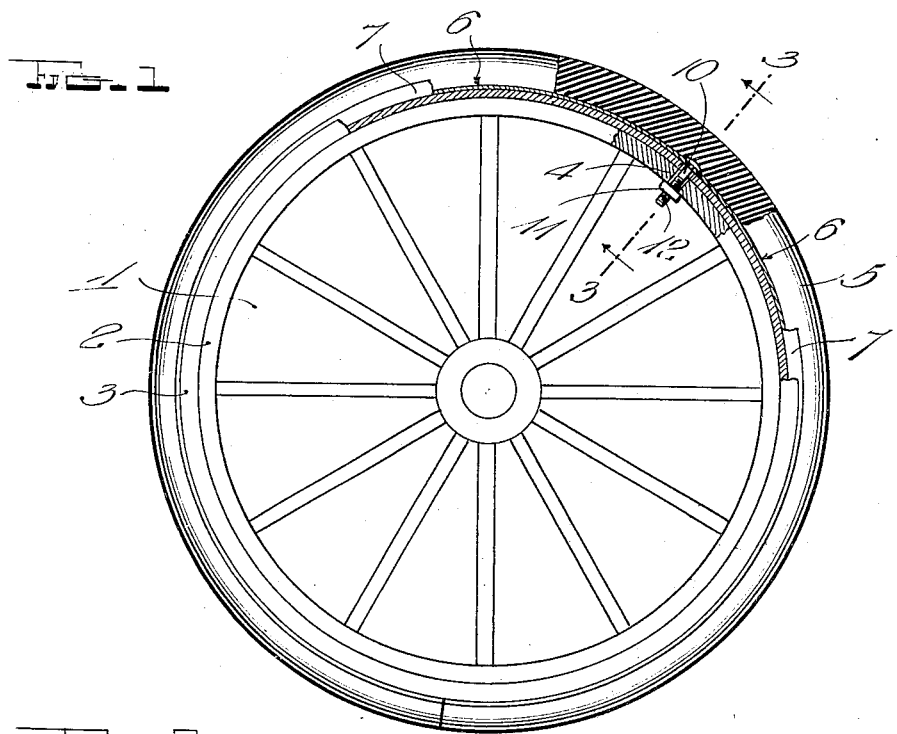
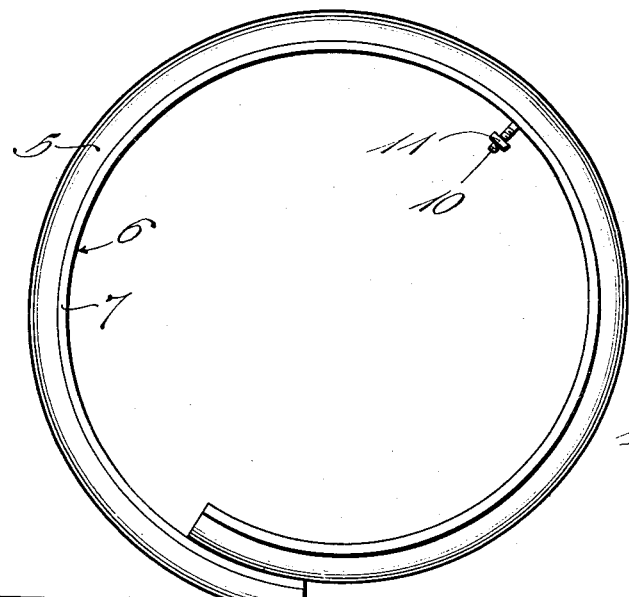
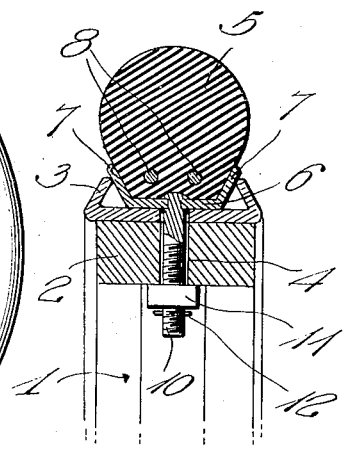
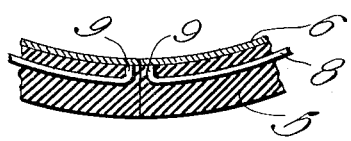
Inventor
J. G. Poe
By H. B. Willson &co
Attorneys

UNITED STATES PATENT OFFICE.

JAMES G. POE, OF DALLAS, TEXAS, ASSIGNOR OF ONE-HALF TO ANDREW B. SMALL, OF DALLAS, TEXAS.

EMERGENCY-TIRE.

1,251,277. Specification of Letters Patent. Patented Dec. 25, 1917.

Application filed August 30, 1917. Serial No. 188,983.

*To all whom it may concern:*

Be it known that I, JAMES G. POE, a citizen of the United States, residing at Dallas, in the county of Dallas and State of Texas, have invented certain new and useful Improvements in Emergency-Tires; and I do declare the following to be a full, clear, and exact description of the invention, such as will enable others skilled in the art to which it appertains to make and use the same.

This invention relates to improvements in automobile tires and has for its object to provide a simply constructed and inexpensive device of this character which may be easily applied on the road in case of emergency, and to this end, the invention resides in the novel features of construction and unique combinations of parts to be hereinafter fully described and claimed, the descriptive matter being supplemented by the accompanying drawing which forms a part of this specification and in which:—

Figure 1 is a side elevation partly in section showing the improved tire applied to an automobile wheel;

Fig. 2 is a side elevation of the tire detached;

Fig. 3 is a transverse section of Fig. 1 on the plane of the line 3—3 thereof; and, Fig. 4 is a detail section of the meeting ends of the tire showing more particularly the manner in which these ends are joined to the auxiliary rim which carries the tire proper.

In the drawings above briefly described, the numeral 1 designates a common type of automobile wheel having the usual felly 2 and rim 3, these parts having the well known opening 4 which ordinarily receives the valve stem of a pneumatic tire. In the present instance, however, the opening 4 is utilized to receive a fastening stud which prevents creeping of the emergency tire upon the rim.

The improved tire includes a body 5 formed of cushioning material such as solid rubber and a split ring 6 assembled with said body and formed of spring metal, said body being split in line with the split of said ring. By reference to Fig. 2, it will be observed that the ring 6 is normally contracted so that its ends overlap, it being thus necessary to expand the entire device and thereby place it under tension before it can be applied to the rim 3, this tension serving to frictionally hold the device upon the wheel.

In the present embodiment of the invention, the ring 6 is in the form of an auxiliary rim having side flanges 7 which receive the base of the cushion tire 5 therebetween. It will be understood, however, that the ring 6 may be of any other suitable form and assembled in any preferred manner with the cushioning body 5.

Any preferred means may be employed for securing the body 5 to the ring 6, but for illustrative purposes I have shown a pair of reinforcing wires 8 passing through the base of said body and having their ends bent laterally at 9 and secured to the ends of said ring by brazing or by any other suitable means.

Employed in connection with the features of construction above described, is a threaded stud 10 which extends inwardly from the ring 6 at a point spaced nearer to one end of said ring than to the other end thereof, this stud being adapted for passage through the opening 4 as above suggested, after which a nut 11 will preferably be threaded on said stud, and if desired, a cotter pin or the like 12 may be employed for locking said nut against accidental removal. By locating the stud 10 where indicated, the tire may be more easily applied to the rim of the automobile wheel, without the necessity of jacking the car up, since the wheel may readily be rolled upon the tire, due to the split formation thereof.

In applying the device, the same is expanded as it is passed over the rim 3, the ends of the device finally coming in contact when it is totally applied. Due to the fact that the auxiliary tire is expanded, as it is applied, it will effectively grip the rim, since it is placed under high tension. The tire will thus remain in place and will be of great advantage in case of emergency.

From the foregoing taken in connection with the accompanying drawing, it will be obvious that although the improved tire is of simple and inexpensive construction, it will be highly efficient and durable for the purposes intended, and since probably the best results are obtained from the specific details of construction shown and described, these features constitute one of the preferred embodiments of the device. I wish it understood, however, that within the scope of the invention, numerous minor changes may well be made without sacrificing the principal advantages.

I claim:

1. An emergency tire comprising an annular body of cushioning material split transversely, and a spring metal ring also split transversely and assembled with said body for contracting the same when not in use until its ends overlap, whereby the tire must be expanded when applied and whereby it will frictionally grip the rim.

2. An emergency tire comprising a resilient auxiliary rim split transversely and adapted to surround the usual automobile rim, said auxiliary rim being contracted with its ends overlapping when not in use, whereby it must be expanded and thus placed under tension when applied, and a cushion tire secured to said auxiliary rim.

3. An emergency tire comprising a resilient auxiliary rim split transversely and adapted to surround the usual automobile rim, said auxiliary rim being contracted with its ends overlapping when not in use, whereby it must be expanded and thus placed under tension when applied, a bolt extending inwardly from said auxiliary rim and adapted for passage through the usual valve stem opening of the automobile rim and felly, and a cushion tire secured to said auxiliary rim.

In testimony whereof I have hereunto set my hand in the presence of two subscribing witnesses.

JAMES G. POE.

Witnesses:
F. H. NEWTON,
Mrs. B. BLAFFER.